United States Patent [19]
O'Toole

[11] 3,890,012
[45] June 17, 1975

[54] HYDRAULIC BRAKES SYSTEM FOR MOBILE VEHICLES

[75] Inventor: Peter J. O'Toole, Newtown, Australia

[73] Assignee: International Harvester Company, Chicago, Ill.

[22] Filed: Feb. 27, 1974

[21] Appl. No.: 446,173

[30] Foreign Application Priority Data
Mar. 5, 1973  Australia............................ 2477/73

[52] U.S. Cl....................... 303/6 R; 303/2; 303/10; 303/68
[51] Int. Cl.² ......................................... B60T 13/16
[58] Field of Search............ 303/6 C, 6 R, 2, 48, 49, 303/84, 10, 7, 68; 188/349, 152, 3, 355, 358, 359

[56] References Cited
UNITED STATES PATENTS

| | | |
|---|---|---|
| 3,395,946 | 8/1968 | Medley et al..................... 303/49 X |
| 3,582,150 | 6/1971 | Williams et al.................. 303/10 X |
| 3,588,191 | 6/1971 | Atkin et al....................... 303/6 R X |
| 3,661,427 | 5/1972 | Hodge............................... 303/10 X |
| 3,768,608 | 10/1973 | Fulmer............................. 303/6 C X |
| 3,788,709 | 1/1974 | Schwerin ................................ 303/7 |

Primary Examiner—Trygve M. Blix
Assistant Examiner—Douglas C. Butler
Attorney, Agent, or Firm—Raymond E. Parks; Floyd B. Harman

[57] ABSTRACT

A mobile vehicle having a low carrying structure operated by a hydraulic system and supported on two pairs of transport wheels. One pair of wheels are provided with brakes operated by a conventional hydraulic brake system whilst the other pair of wheels have brakes operated by a hydraulic intensifier, the low pressure side of which communicates with the hydraulic system of the load carrying structure via an automatic control valve which is activated to energize the hydraulic intensifier upon activation of the conventional brakes.

4 Claims, 2 Drawing Figures

HYDRAULIC BRAKES SYSTEM FOR MOBILE VEHICLES

This invention relates to a hydraulically actuated braking system for mobile vehicles and is particularly suitable to mobile cranes, earth moving vehicles and the like.

Many cranes and earth moving vehicles are built on basic chassis engine and drive assembly of a conventional tractor and this can present difficulties in providing an adequate braking system. However, when these tractors are converted to cranes or earth moving equipment, the all-up-weight when loaded is greatly increased, and more particularly there is a change in weight distribution whereby the front wheels of the tractor carry the larger proportion of the weight.

As the conventional tractor has brakes fitted only to the rear driving wheels, it has previously been proposed to fit additional brakes to the front wheels, which for constructural considerations, are usually air operated. This incurs the additional expense of adding a compressor to the vehicle which must be driven by the engine.

It is the object of the present invention to provide an auxiliary braking system which is simple and inexpensive to interconnect with an existing vehicle braking system.

With this object in view, there is provided a mobile vehicle having a load carrying structure operated by a pressurized hydraulic accessory system including fluid input and return conduits first and second pairs of ground-engaging wheels, including brakes therefor, to support the vehicle, a main hydraulic pressure actuated brake system means for operating the brakes on each wheel of the first pair including operator actuated means for pressurizing the main brake system, an auxiliary hydraulic pressure actuated brake system means for operating the brakes on each wheel of the second pair including a hydraulic intensifier means having a low pressure side in communication with the return conduit in the hydraulic accessory system returning hydraulic fluid to a reservoir and a high pressure side in communication with the auxiliary brake system for pressurizing same and actuating the brakes on each wheel of the second pair; a control valve means in the return conduit downstream of the point of connection of the intensifier to the return conduit for varying the pressure in the return line upstream of the control valve means including pilot valve means operable in response to pressurization of the main brake system means on the first pair of wheels for operating the control valve to restrict the flow in the return conduit and increase the pressure in the low pressure side of the intensifier for pressurizing the high pressure side and actuating the brake means on each wheel of the second pair of wheels.

Conventionally, the control valve is adapted to be operated by the pressure applied to the main brake means on said one pair of wheels so that upon an increase of pressure in the circuit of said main brake means, the control valve operates to restrict the fluid flow in the return conduit to develop a back pressure therein, said back pressure being applied to the low pressure side of the hydraulic intensifier to effect operation of the brake means on the other pair of wheels.

It will be appreciated that the use of such a brake system enables the brakes on both pairs of wheels to be operated from a single control unit, such as a conventional brake master cylinder, without significantly increasing the pedal pressure required to be applied by the operator as the actuating pressure for the auxiliary brakes on the other pair of wheels is derived from the hydraulic system of the vehicle.

Preferably, when this auxiliary hydraulic braking system is applied to a machine based on a conventional tractor, the main hydraulic braking system on the rear driving wheels of the tractor remains unaltered and the hydraulic intensifier of the auxiliary braking system is applied to operate the auxiliary brakes on the wheels on the front axle which is normally an axle constructed especially for the particular machine and not the conventional front axle of the tractor. It is a relatively simple and cheap modification to the tractor to incorporate the control valve in the fluid return line of the hydraulic accessory system and to connect this control valve by a branch line to the fluid pressure line of the normal or main brake system of the brake.

The invention will be more readily understood from the following description of one practical arrangement of the braking system as illustrated in the accompanying drawings.

Figure 1:
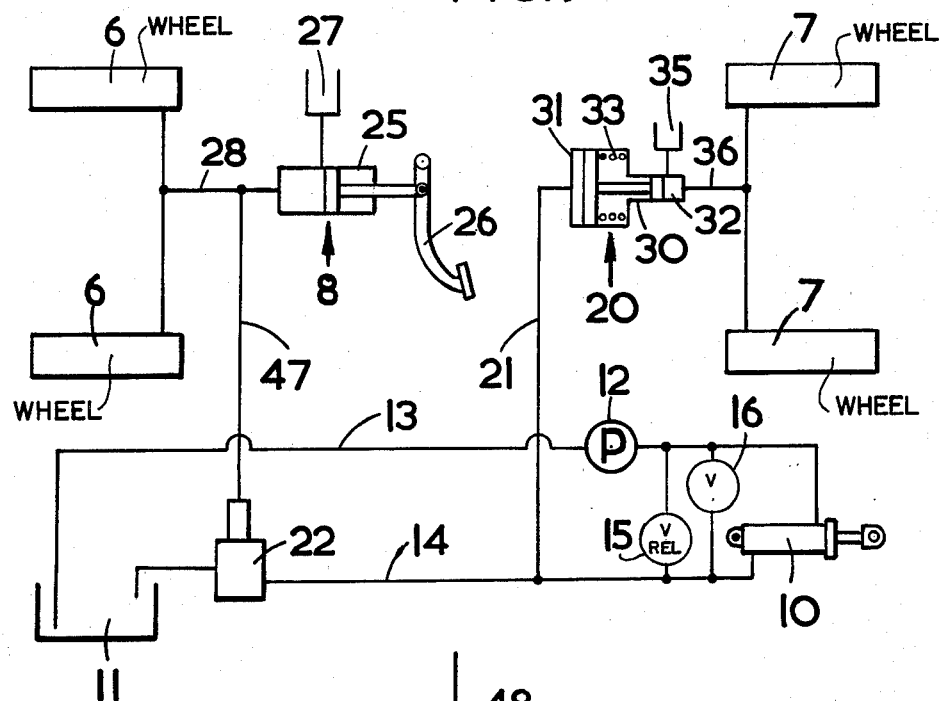
FIG. 1 is a diagrammatic layout of the brake system applied to a vehicle.

Referring now to FIG. 1, the two pairs of ground-engaging wheels of the vehicle are indicated at 6 and 7 respectively, the brakes (not shown) on the pair of wheels 6 being operated by a conventional hydraulic brake mechanism indicated at 8. The hydraulic cylinder 10 is representative of a work performing mechanism operated by a hydraulic accessory system, and may take the form of a boom for a crane, a shovel for a loader, a blade for a bulldozer or grader or any other structure operated by a hydraulic cylinder or motor.

Fluid to operate the hydraulic cylinder 10 is drawn from the reservoir 11 by the pump 12 through the fluid input conduit 13 and is returned from the hydraulic cylinder to the reservoir by the fluid return conduit 14. The conduits 13 and 14 are connected via a pressure relief valve 15 and control valve 16 so that when the pump is in operation, but the hydraulic cylinder is not in use, the fluid is by-passed back to the reservoir.

In the auxiliary hydraulic brake system, the brake mechanisms (not shown) on the pair of wheels 7 is operated by the high pressure portion of the hydraulic intensifier 20, the low pressure side of which is connected by the conduit 21 to the return line 14 of the work-performing hydraulic system of the vehicle. Inserted in the return line 14, downstream of the point of connection of the conduit 21 is a control valve 22.

The to main hydraulic braking system operating on the brakes of the wheels 6 may be of a conventional construction employing a master cylinder 25, the piston of which is actuated by the foot pedal 26. The brake fluid reservoir 27 is connected to the master cylinder in the usual manner, and fluid from the master cylinder is delivered via the conduit 28 to the slave cylinders of the brake mechanisms mounted on the wheel 6.

The double ended piston 30 of the hydraulic intensifier 20 has the large diameter end operating in the low pressure cylinder 31 and the small diameter end in the high pressure cylinder 32. The pressure of the fluid in the return line 14 is applied to the low pressure cylinder, via the conduit 21, to urge the piston to move in a direction to increase the pressure in the high pressure end of the intensifier, and thus apply pressure fluid via the conduit 36 to the slave cylinders (not shown) on the brake mechanisms of the wheels 7. The spring 33 acts to return the piston in response to a pressure drop in the low pressure cylinder. The high pressure cylinder 32 is connected to a fluid reservoir 35 to maintain the required quantity of fluid in the high pressure system.

Figure 2:
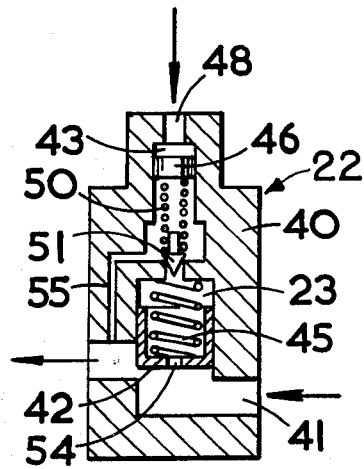
FIG. 2 is a sectional view through the main control valve.

The control valve 22 is shown in further detail in FIG. 2 of the drawings and comprises a body 40 having a passage 41 therethrough which, in use, constitutes portion of the return line 14 of the hydraulic circuit of the vehicle. The spool 42 operates in the bore 23 and projects into the passage 41 to close or restrict the passage as will be explained in further detail later. The spring 45 urges the spool 42 to move in a direction to restrict or close the passage 41.

The pilot piston 46 operates in the bore 43 under the influence of the fluid pressure from the master cylinder 25 via the conduit 47 which connects with the port 48. The pressure applied to the pilot piston 46 by the master cylinder is transmitted through the spring 50 to the pilot valve 51. The pilot valve regulates the flow of fluid through the orifice 54 in the spool valve and the passage 55 which communicates with the passage 41 downstream of the spool valve. The free length of the spring 50 is such that, when the master cylinder 25 is not operating, no force will be applied to the pilot valve 51 to retain it closed, and hence there will be a free flow of fluid through the orifice 54 in the spool valve 42.

In operation, the main spool 42 of the control valve is subject to the pressure return line 14 on its upstream side and this is balanced on the opposite pilot valve side by the spring 50 and the pressure applied to the pilot valve 51 to retain it closed. The pressure drop across the spool caused by the flow through the orifice 54 is balanced by the spool spring 45 and thus determines the position of the main spool and the resultant upstream pressure is the return line 14 acting on the lower pressure side of the intensifier.

The pilot valve 51 is controlled by the pressure on a pilot piston which acts on the pilot valve via a spring 50. When the brake master cylinder is actuated, the pressure on the pilot piston is the main brake system pressure, thus the pressure in the return line 14 relative to pressure in the main brake system is basically controlled by the area of the pilot piston.

With zero pressure in the main brake system, the pilot spring 50 is free and thus the pilot valve 51 is open and the back pressure in the return line 14 is minimal. The spring provided to act on the main spool is kept as light as possible so that there is minimal pressure in the return line when the brake is not in operation.

When the master cylinder is actuated so as to energise the brake mechanism on the wheels 6, the fluid pressure in the master cylinder is also applied to the pilot piston in the control valve, and this pressure is applied via the spring 50 to the pilot valve to hold the latter closed. This closing of the pilot valve results in the spool valve placing a further restriction in the return line 14 so that the upstream pressure in the return line increases. This increased pressure in the return line actuates the brake system on the wheels 7 via the hydraulic intensifier.

The arrangement of the brake system is simple to install as there is a minimum interference with the brake and hydraulic systems of the vehicle. Also, the additional braking effect is obtained with any increase in pressure applied by the operator to the brake pedal.

The back pressure in conduit 14 is not high so as not to interfere with the normal operation of the existing hydraulic components in the work performing circuit. The intensifier spring 33 is of sufficient strength to return the pistons 31 and 32, against the normal back pressure in the return conduit 14, in order to release the brakes on the wheels 7.

I claim:

1. In a mobile vehicle having a hydraulic accessory system including a fluid return conduit; first and second pairs of vehicle supporting wheels including brakes therefor; a hydraulic pressure actuated main brake system means for operating the brakes of the first pair of wheels including operator actuated means for pressurizing the main brake system means and applying the brakes of the first pair of wheels; a hydraulic pressure actuated auxiliary brake system means for operating the brakes of the second pair of wheels including a hydraulic intensifier means having a low pressure side connected for communication to the return conduit and a high pressure side communicating with the auxiliary brake system for pressurizing same and applying the brakes of the second pair of wheels; a control valve means in the return conduit downstream of the point of connection of the intensifier means to the return conduit for varying the pressure in the return line upstream of the control valve means, the control valve means being pressure responsive and connected for communication to the main brake system means operable in response to pressurization of the main brake system means for operating the control valve to restrict the flow in the return conduit and increase the pressure in the low pressure side of the intensifier means for pressurizing the high pressure side and activating the brakes of the second pair of wheels.

2. In a mobile vehicle as claimed in claim 1 wherein the intensifier means comprise two spaced apart connected pistons of different diameters in a cylinder of corresponding stepped diameters, the high pressure side of the cylinder and the one piston therein being of a lesser diameter than the low pressure side of the cylinder and the other piston therein.

3. In a mobile vehicle, as claimed in claim 1, wherein the control valve means further includes a housing having fluid inlet and outlet ports communicating with an end of an intersecting bore and a passageway communicating an opposite end of the bore with the outlet port, the inlet port being connected to the return conduit and the outlet port being connected to a fluid reservoir; a piston valve reciprocally carried in the bore including a first spring means in the opposite end of the bore for urging the piston valve in a direction for closing communication between the ports, the piston valve having an opening therethrough restrictively communicating the opposite end of the bore with the inlet port; and a pilot poppet valve means in the passageway including a pilot piston having a piston face side communicating with the main brake system means and an opposite piston face side reacting against a second spring means for urging the pilot poppet valve in a direction for blocking communication between the opposite end of the bore and the outlet port.

4. In a mobile vehicle as claimed in claim 3 wherein the inlet port is connected to the low pressure side of the intensifier means and the intensifier means comprise two spaced apart connected pistons of different diameters in a cylinder of corresponding stepped diameters, the high pressure side of the cylinder and the one piston therein being of a lesser diameter than the low pressure side of the cylinder and the other piston therein, and spring means for urging the piston in the low pressure side of the cylinder in a direction away from the high pressure side of the cylinder.

* * * * *